(12) United States Patent
Koganehira

(10) Patent No.: US 7,503,968 B2
(45) Date of Patent: Mar. 17, 2009

(54) BLACK INK COMPOSITION, AND RECORDING METHOD AND RECORDED ARTICLE USING THE SAME

(75) Inventor: Shuichi Koganehira, Nagano-ken (JP)

(73) Assignee: Sieko Epson Corporation, Tokyo (JP)

( * ) Notice: Subject to any disclaimer, the term of this patent is extended or adjusted under 35 U.S.C. 154(b) by 141 days.

(21) Appl. No.: 11/336,631

(22) Filed: Jan. 20, 2006

(65) Prior Publication Data

US 2006/0162614 A1 Jul. 27, 2006

(30) Foreign Application Priority Data

Jan. 27, 2005 (JP) ............................. 2005-019124

(51) Int. Cl.
*C09D 11/02* (2006.01)

(52) U.S. Cl. ..................................................... 106/31.6

(58) Field of Classification Search ................. 106/31.6
See application file for complete search history.

(56) References Cited

U.S. PATENT DOCUMENTS

| | | | |
|---|---|---|---|
| 5,803,958 A | 9/1998 | Katsen | |
| 6,565,202 B2 | 5/2003 | Rose | |
| 6,648,953 B2 * | 11/2003 | Yamazaki et al. | 106/31.68 |
| 2005/0171239 A1 * | 8/2005 | Bauer et al. | 523/160 |
| 2005/0171240 A1 * | 8/2005 | Bauer et al. | 523/160 |

FOREIGN PATENT DOCUMENTS

GB 2 370 580 A 7/2002

* cited by examiner

*Primary Examiner*—Jerry Lorengo
*Assistant Examiner*—Veronica Faison Gee
(74) *Attorney, Agent, or Firm*—Ladas & Parry LLP

(57) ABSTRACT

A black ink composition includes a phthalocyanine-based pigment, a benzimidazolone-based pigment and a carbon black pigment.

14 Claims, 1 Drawing Sheet

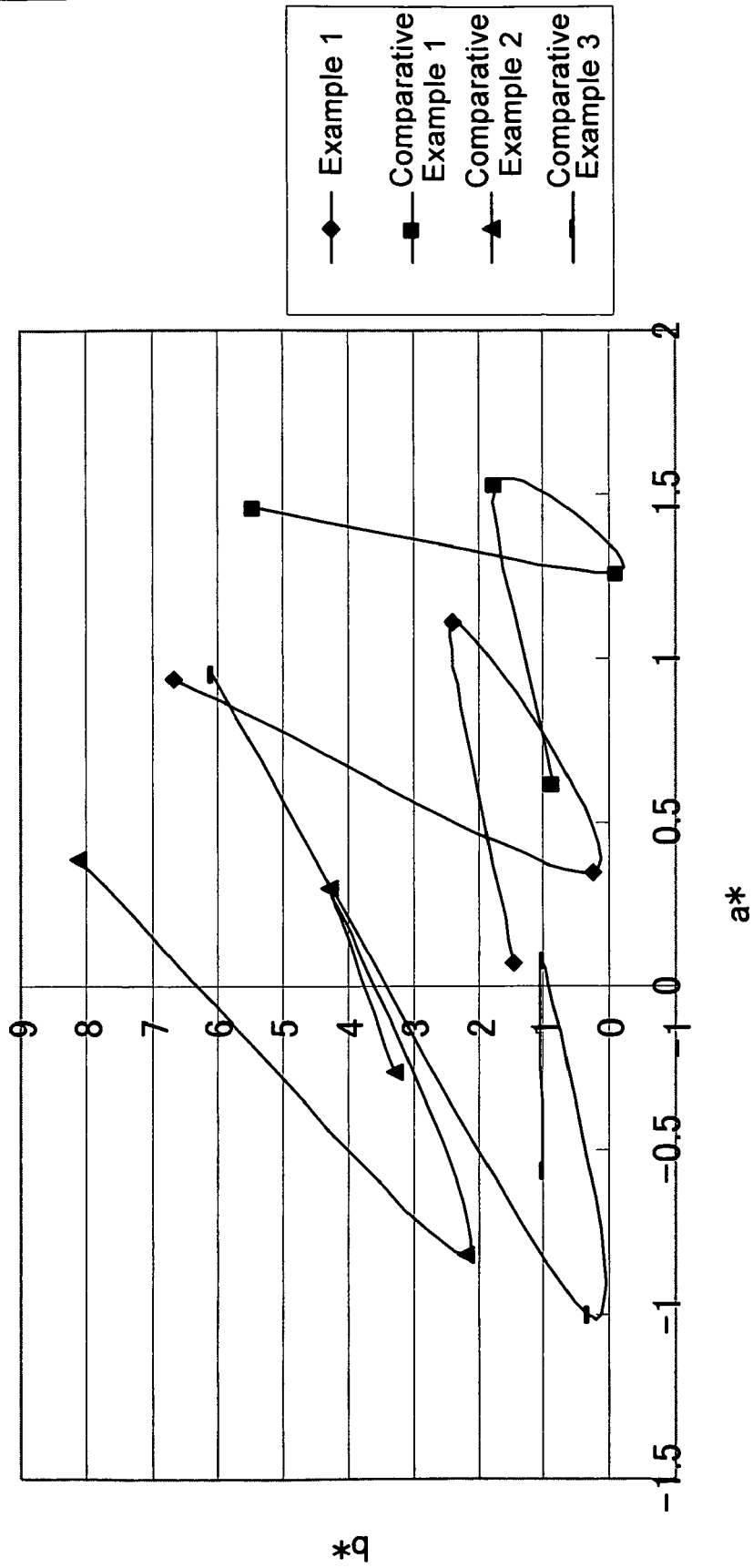

BLACK INK COMPOSITION, AND RECORDING METHOD AND RECORDED ARTICLE USING THE SAME

The entire disclosure of Japanese Patent Application No. 2005-019124, filed Jan. 27, 2005, is expressly incorporated herein by reference.

BACKGROUND

1. Technical Field

The present invention relates to an ink composition mainly for photo black ink. More specifically, the invention relates to a black ink composition that can realize a neutral black color not only in a reflected color seen from a point a 2-degree angle away from the 45-degree angle specular reflection to a normal illumination at a 45-degree angle, in the direction away from the perpendicular line (bronze color), but also in a visually perceived color (reflected color seen from a point a 20-degree angle away from the 45-degree angle specular reflection to a normal illumination at a 45-degree angle, in the direction away from the perpendicular line).

2. Related Art

Various black ink compositions using a complementary color pigment and enabling a neutral black output have been developed up to now.

British Patent No. 2370580A discloses obtaining a low-saturation black ink composition by adding a phthalocyanine-based pigment as well as a dioxane-based pigment as a complementary color pigment. However, when that black ink composition is applied to a medium having a layer of resin coating, the output is not visually perceived as a neutral black.

U.S. Pat. Nos. 5,803,958 and 6,565,202B2 also disclose a black ink composition using a complementary color pigment. However, the disclosed black ink compositions have the ratio of the complementary color pigment to a carbon black pigment of not less than 0.66, and, as in the one disclosed in the above British Patent, their output is not visually perceived as a neutral black.

SUMMARY

An advantage of some aspects of the invention, which aims at solving the above-described problems in prior art, is a black ink composition that enables a neutral black output with improved glossiness and blackness both in a bronze color (2-degree angle calorimetric value) and in a visually perceived color (20-degree angle calorimetric value).

Another advantage of some aspects of the invention is a recording method that enables a neutral black output with improved glossiness and blackness both in a 2-degree angle calorimetric value and in a 20-degree angle colorimetric value.

After effort and research, the inventor has found that a black ink composition using a specific pigment as a complementary color pigment can bring about the above-described advantages.

The invention has been completed based on the above finding, and according to an aspect of the invention, the following is provided:

1. A black ink composition containing a phthalocyanine-based pigment, a benzimidazolone-based pigment and a carbon black pigment.

The following (2 through 10) are also provided according to some aspects of the invention:

2. The black ink composition according to 1 above, wherein, when the black ink composition is applied to a medium having a layer of resin coating, if it exhibits a 20-degree angle colorimetry L* value of 0.5 or less, it exhibits a 20-degree angle colorimetry a* value larger than a 2-degree angle colorimetry a* value by a value ranging from 0 to 1.3 inclusive.

3. The black ink composition according to 1 above, wherein the phthalocyanine-based pigment is C. I. Pigment Blue 15:4, C. I. Pigment Blue 15:3 or C. I. Pigment Blue 15:2.

4. The black ink composition according to 1 above, wherein the benzimidazolone-based pigment is selected from the group consisting of C. I. Pigment Yellow 151, C. I. Pigment Yellow 180, C. I. Pigment Yellow 181, C. I. Pigment Orange 64, C. I. Pigment Violet 32 and C. I. Pigment Red 185.

5. The black ink composition according to 1 above, wherein the weight ratio of the total amount of the phthalocyanine-based pigment and the benzimidazolone-based pigment to the carbon black pigment is 1:2, or less.

6. The black ink composition according to 1 above, wherein the weight ratio between the phthalocyanine-based pigment, the benzimidazolone-based pigment and the carbon black pigment is (0.01 to 0.15):(0.01 to 0.15):1.5.

7. The black ink composition according to 1 above, wherein the weight ratio of the phthalocyanine-based pigment to the benzimidazolone-based pigment is within the range of 1:2 to 1:10.

8. An ink cartridge containing at least the above-described black ink composition.

9. A recording method for conducting recording by using at least the above-described black ink composition.

10. A recorded article recorded by using at least the above-described black ink composition.

BRIEF DESCRIPTION OF THE DRAWINGS

FIG. 1 is a graph showing the a* value and b* value relationship in 2-degree angle colorimetry performed for outputs of respective ink compositions prepared in an example and in comparative examples.

DESCRIPTION OF EXEMPLARY EMBODIMENTS

Black Ink Composition

A black ink composition according to the invention is described below, referring to its preferred embodiments.

As stated above, a black ink composition according to the invention contains a phthalocyanine-based pigment, a benzimidazolone-based pigment and a carbon black pigment.

It is preferable that when the black ink composition according to the invention is applied to a medium having a layer of resin coating, if it exhibits a 20-degree angle colorimetry L* value of 0.5 or less, it exhibits a 20-degree angle colorimetry a* value larger than a 2-degree angle colorimetry a* value by a value ranging from 0 to 1.3 inclusive. When the above values are within the above range, it is possible to output a neutral black recorded article with further improved glossiness and blackness both in a 20-degree angle calorimetric value and in a 2-degree angle colorimetric value.

The "2-degree angle colorimetry" referred to herein means the color measurement of a reflected color seen from a point a 2-degree angle away from the 45-degree angle specular reflection to a normal illumination at a 45-degree angle, in the direction away from the perpendicular line (bronze color). Also, the "20-degree angle colorimetry" referred to herein means the color measurement of a reflected color seen from a point a 20-degree angle away from the 45-degree angle specular reflection to a normal illumination at a 45-degree angle, in the direction away from the perpendicular line. The a* value and the L* value respectively mean values calculated based on the CIE Lab under a D65 light source specified by the International Commission of Illumination (CIE).

The "medium having a layer of resin coating" referred to herein includes any medium as long as the face of the medium on which an image is generated using the above-described black ink composition (recordable face) is coated with at least a layer of resin. As the medium having the layer of resin coating, one with a gloss value of 120 or less at an 85-degree measurement angle is normally used. An 85-degree angle gloss value is measured by using, for example, "PG1M" from Nippon Denshoku Industries Co., Ltd. In the measurement, a gloss-meter is adjusted in advance so that the 85-degree angle gloss value for a standard gloss plate is indicated as 100.

One example of a medium having a layer of resin coating is a mirror-like medium having an 85-degree angle gloss value of 70 to 120, which includes, for example, a medium having a layer of resin coating where when it is lit by a fluorescent light from 1 meter or more away, a mapping of the fluorescent light is created with a visually observable outline. Typical examples include "PGPP (Premium Glossy Photo Paper)" and "Photo Paper <Gloss>," both from Seiko Epson Corporation and with an 85-degree angle gloss value of 81.

Other examples of a medium having a layer of resin coating include a semi-glossy medium having an 85-degree angle gloss value of 10 to 70 and a mat medium having an 85-degree angle gloss value of 10 or less.

Examples of the phthalocyanine-based pigment used for the invention include C. I. Pigment Blue 15:4, C. I. Pigment Blue 15:3 and C. I. Pigment Blue 15:2. These pigments may be used alone or in a combination of two or more types.

Examples of the benzimidazolone-based pigment used for the invention include C. I. Pigment Yellow 151, C. I. Pigment Yellow 180, C. I. Pigment Yellow 181, C. I. Pigment Orange 64, C. I. Pigment Violet 32 and C. I. Pigment Red 185. These pigments may be used alone or in a combination of two or more types.

There is no particular limitation on the carbon black pigment used for the invention, and carbon black normally used for black pigment may be used.

In the invention, it is preferable that the weight ratio of the total amount of the phthalocyanine-based pigment and the benzimidazolone-based pigment to the carbon black pigment is 1:2, or less, because with the ratio within that range, the L* value becomes small in the 20-degree and 2-degree angle colorimetry.

It is also preferable that the weight ratio between the phthalocyanine-based pigment, the benzimidazolone-based pigment and the carbon black pigment is (0.01 to 0.15):(0.01 to 0.15):1.5, because with the ratio within that range, a neutral black output with improved glossiness and blackness can be obtained.

With a view to enabling a neutral black output, it is also preferable that the weight ratio of benzimidazolone-based pigment to the phthalocyanine-based pigment is within the range of 1:2 to 1:10.

The total amount of the phthalocyanine-based pigment, the benzimidazolone-based pigment and the carbon black pigment is preferably from 1.0 to 4.0 weight % relative to the black ink composition according to the invention.

Besides the above-described pigments, the black ink composition according to the invention preferably contains a high boiling point organic solvent as a wetting agent. If a high boiling point organic solvent is added, it prevents ink from drying when being used for inkjet recording, and reduces clogging in inkjet printer heads. Examples of the high boiling point organic solvent include: polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerine, trimethylol ethane and trimetylol propane; polyhydric alcohol alkyl ethers such as ethylene glycol monoethyl ether, ethylene glycol monobutyl ether, diethylene glycol monomethyl ether, diethylene glycol monoethyl ether, diethylene glycol monobuthyl ether, triethylene glycol monomethyl ether, triethylene glycol monoethyl ether and triethylene glycol monobuthyl ether; organic alkalis such as urea, 2-pyrrolidone, N-methyl-2-pyrrolidone, 1,3-dimethyl-2-imidazolydinone and triethanolamine; and saccharides such as saccharide alcohols, and these may be used alone or in a combination of two or more types.

The high boiling point organic solvent is contained in the black ink composition according to the invention in an amount preferably from 5 to 30 weight %, more preferably from 10 to 20 weight %.

In particular, in order to improve clogging prevention and the glossiness of recorded images, it is preferable that 12 or more weight % of glycerine is added to the black ink composition according to the invention. In addition to glycerine, organic alkalis such as triethanolamine may also be added. Triethanolamine further functions as a pH regulator and a dispersion stabilizer for ink, and preferably is used in an amount ranging from 0.1 to 10 weight %.

It is preferable that the black ink composition according to the invention uses the above-described particular pigments as colorants, and in addition, contains a dispersant for dispersing the pigments. There is no particular limitation on the dispersant so long as it is able to be used in this kind of pigment ink. For example, cationic dispersants, anionic dispersants, nonionic dispersants or surfactants can be used. Examples of anionic dispersants include: polyacrylic acid; polymethacrylic acid; acrylic acid-acrylonitrile copolymer; vinyl acetate-acrylic acid ester copolymer; acrylic acid-acrylic acid alkyl ester copolymer; styrene-acrylic acid copolymer; styrene-methacrylic acid copolymer; styrene-acrylic acid-acrylic acid alkyl ester copolymer; styrene-methacrylic acid-acrylic acid alkyl ester copolymer; styrene-alpha-methylstyrene-acrylic acid copolymers; styrene-alpha-methylstyrene-acrylic acid-acrylic acid alkyl ester copolymer; styrene-maleic acid copolymer; vinylnaphthalene-maleic acid copolymer; vinyl acetate-ethylene copolymer; vinyl acetate-fatty acid vinyl-ethylene copolymer; vinyl acetate-maleic acid ester copolymer; vinyl acetate-crotonic acid copolymer; and vinyl acetate-acrylic acid copolymer. Examples of anionic surfactants include: sodium dodecylbenzenesulfonate; sodium laurate; and ammonium salts of polyoxyethylene alkyl ether sulfate. Examples of nonionic surfactants include: polyoxyethylene alkyl ether, polyoxyethylene alkyl ester, polyoxyethylenesorbitan fatty acid ester, polyoxyethylene alkyl phenyl ether, polyoxyethylene alkylamine, and polyoxyethylene alkylamide. These may be used alone or in a combination of two or more types. In particular, from the viewpoint of enhancing stability in dispersing pigments, styrene-(meth)acrylic acid copolymers are preferable.

The dispersant is contained in the black ink composition according to the invention normally in an amount of not more than 140 weight % relative to the total weight of the above-described pigments when calculated as a solid.

The dispersant is preferably contained in an amount ranging from 10 to 140 weight %, more preferably from 10 to 100 weight %, relative to the total weight of the above pigments when calculated as a solid. Furthermore, the contained amount of the dispersant is preferably from 0.1 to 10 weight % relative to the total amount of ink, more preferably from 0.3 to 3 weight %.

Furthermore, with a view to improving the wetting properties with respect to a recording medium and thereby promoting the penetration of ink, the black ink composition according to the invention may contain a penetration accelerator. Examples of the penetration accelerator include: alcohols such as methanol, ethanol, and iso-propyl alcohol; polyhydric alcohol lower alkyl ethers such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether; and diols such as 1,2-pentanediol and 1,2-hexanediol. These penetration accelerators may be used alone or in a combination of two or more types. In particular, it is preferable to use diethylene glycol monobutyl ether, triethylene glycol monobutyl ether or 1,2-hexanediol, or a combination of two or more of them.

The penetration accelerator is contained in the ink in an amount preferably from 1 to 20 weight %, more preferably from 5 to 15 weight %.

With the same idea as in the above-described penetration accelerator, of improving the wetting properties with respect to a recording medium and thereby promoting the penetration of ink, the black ink composition according to the invention may also use various types of surfactants such as anionic surfactants, nonionic surfactants, cationic surfactants, and amphoteric surfactants. In particular, acetylene glycol-type compounds or silicone-type compounds are preferably used. Commercially available products can be used as such acetylene glycol-type compounds, examples of which are Olfine Y, and Surfynol 82, 440, 465 and 485 (all product names, from Air Products and Chemicals, Inc.), and Olfine STG and Olfine E1010 (both product names, from Nisshin Chemical Industry Co., Ltd.), and these compounds may be used alone or in a combination of two or more types. In particular, Olfine E1010 and Surfynol 465 are preferably used. Also, polysiloxane-type compounds such as the commercially available products named BYK347, BYK348 and BYKUV3510 (from BYK-Chemie Japan K.K.) can be used as the above-mentioned silicone-type compounds. Polysiloxane-type compounds are particularly preferable with respect to attaining glossiness and containing abrasion-resistant properties.

The acetylene glycol-type compounds and/or silicone-type compounds are contained in the ink in an amount preferably from 0.01 to 5 weight %, more preferably from 0.1 to 1.0 weight %, more preferably still, from 0.1 to 0.5 weight %.

Furthermore, with a view to shortening the time of drying ink, the black ink composition according to the invention may contain a low boiling point organic solvent. Examples of the low boiling point organic solvent include: methanol, ethanol, n-propyl alcohol, iso-propyl alcohol, n-butanol, sec-butanol, tert-butanol, iso-butanol, and n-pentanol, and these may be used alone or in a combination of two or more types. In particular, monohydric alcohols are preferably used.

The black ink composition according to the invention contains the above-described pigments, dispersant, high boiling point organic solvent, penetration accelerator, acetylene glycol-type compounds and/or silicone-type compounds, and such other constituent components, and normally contains water as a balancing constituent. Preferable water is pure water or extra-pure water such as ion-exchange water, ultra-filtered water, reverse-osmosis water, or distilled water. In particular, it is preferable for the above types of water to be subjected to sterilization processes involving ultraviolet irradiation, hydrogen peroxide addition, or similar, because water so processed can prevent the generation of fungi and bacteria for a long period of time.

The black ink composition according to the invention may further contain additives as required, examples of which include: a fixing agent such as soluble rosins; a preservative and fungicide such as sodium benzoate; an oxidation inhibitor and ultraviolet absorber such as alohanates; a chelating agent; an oxygen absorber; and a pH regulator, and these additives may be used alone or in a combination of two or more types.

The black ink composition according to the invention may be prepared as conventional pigment ink is, by using conventional devices such as a ball mill, sand mill, atreiter, basket mill or rolling mill. During the preparation, it is preferable to eliminate coarse particles by using a membrane filter, a mesh filter, or other such filter.

There is no particular limitation on the purpose of use for the black ink composition according to the invention. However, it is preferable that the black ink composition be used for an inkjet recording method including discharging ink droplets from a nozzle, adhering the discharged droplets onto a medium and then generating an image of characters, figures, etc. It is particularly preferable that it be used for an on-demand inkjet recording method. Examples of on-demand inkjet recording methods include: a piezoelectric element recording method where recordation is performed using piezoelectric elements arranged in a printer head, and a thermal jet recording method where recordation is performed using thermal energy derived from a heater having heat-generating resistive elements arranged in a printer head, and the present black ink composition can be suitably used for either of those inkjet recording methods. The invention may be embodied in an ink composition mainly used for generating photo black images on a recording medium such as photo paper, or may be embodied in an ink cartridge containing the above-described black ink composition.

The black ink composition according to the invention may be applied to any recording medium that is normally used in an inkjet recording method or similar, without limitation on an applicable medium for generating images. However, the black ink composition is preferably applied to the above-described medium having a layer of coating such as resin, plain paper (medium with fibers exposed on its recorded surface), or similar. Specifically, when the black ink composition according to the invention is applied to a medium having a layer of resin coating, conspicuous granularity in an image generated with dots can be significantly reduced.

Recording Method

Another aspect of the invention is a recording method for generating an image using the above-described black ink composition. In particular, a preferred recording method is one such as an inkjet recording method using the black ink composition in the above-described embodiment. Except for using the above-described black ink composition, the recording method according to the invention is implemented as a normal inkjet recording method or similar is.

With the recording method according to the invention, it is possible to output a recorded article having neutral black with improved glossiness and blackness both in the 20-degree angle colorimetric value and in the 2-degree angle colorimetric value.

In the recording method according to the invention, it is preferable that an image is generated in such a manner that the used ink amount is from 7 to 13 mg/inch$^2$ at 100% duty. Furthermore, in the case of mixed color, it is preferable that an image is generated in such a manner that the used ink amount is from 8 to 16 mg/inch$^2$ at 120% duty.

The "duty" referred to herein indicates the unit of a value D defined and calculated according to the following formula:

D={Actual no. dots printed/(Vertical resolution×Horizontal resolution)}×100

(In this formula, "actual no. dots printed" refers to the actual number of dots printed per unit area, and "vertical resolution" and "horizontal resolution" refer to respective resolutions per unit area.) 100% duty indicates the maximum amount of monochrome ink applicable onto the pixels in a unit area.

Recorded Article

Another aspect of the invention is a recorded article on which an image is generated by using the above-described black ink composition. In particular, a preferred recorded article is one using the black ink composition explained in the above-described embodiment.

Modification

The invention is preferably embodied in the above-described respective forms. However, the invention is not limited to those embodiments, and various modifications may be made without departing from the spirit of the invention.

According to the invention, a black ink composition that enables a neutral black output with improved glossiness and blackness both in the 20-degree angle calorimetric value and the 2-degree angle colorimetric value is provided.

Next, the invention is explained below in further detail, referring to examples according to the invention, but these examples do not limit the invention by any means.

EXAMPLE 1

Color Measurement of Black Ink Composition Outputs

Each black ink composition was prepared according to the composition shown in Table 1, and then supplied to an ink cartridge of an inkjet printer PM960C (from Seiko Epson Corporation). Using this printer, the respective black ink compositions were output on Photo Paper "Gloss" (from Seiko Epson Corporation, a medium having a layer of resin coating) at 1440*1440 dpi resolution, and at the respective duty levels of 20%, 40%, 60%, and 80%.

TABLE 1

|  | Example 1 | Comparative Example 1 | Comparative Example 2 | Comparative Example 3 |
|---|---|---|---|---|
| Glycerine | 14.0 | 14.0 | 14.0 | 14.0 |
| 1,2-hexanediol | 8.0 | 8.0 | 8.0 | 8.0 |
| Triethanolamine | 0.9 | 0.9 | 0.9 | 0.9 |
| BYK348 | 0.1 | 0.1 | 0.1 | 0.1 |
| Styrene-acrylic resin | 1.5 | 1.5 | 1.5 | 1.5 |
| Carbon black | 1.5 | 1.6 | 1.6 | 1.8 |
| C.I. Pigment Blue 15:4 | 0.2 | 0.2 | 0.0 | 0.0 |
| C.I. Pigment Violet 32 | 0.1 | 0.0 | 0.2 | 0.0 |
| Pure water | balance | balance | balance | balance |
| Total | 100.0 | 100.0 | 100.0 | 100.0 |

Glossiness Evaluation

Concerning the recorded articles obtained in each example, the reflected light intensity was measured by using a goniophotometer (Type GP-200 from Murakami Color Research Laboratory Co., Ltd.), at certain reflection angles within the range from 42° to 48°, under the conditions of an incident angle of 45° (slit width: φ1 mm on the incidence side and φ1.5 mm on the reflection side), sensitivity of 500, and a tilt angle of 0°. In this measurement, a 12 V-50 W halogen lamp was used as a light source and an ND-10 was used as a filter, and voltage applied to the light source was adjusted so that the gloss value of a normal plate would be measured as 42.5. The gloss value of a recorded article was defined as the maximum value in the respective reflected light intensity values measured under the above conditions. Variance in the gloss values repeatedly measured in the above manner did not exceed ±2.0. Then, the glossy feeling of the respective recorded articles was calculated according to the below formula.

Glossy feeling=Gloss value/(Sharpness)$^2$

In this formula, the "gloss value" means the gloss value obtained by the above measurement, and the "sharpness" means how sharp a recorded image is (also referred to as image clarity), which corresponds to the width of the reflection angles at which the reflected light intensity was measured as 0.6 or more in the above-described gloss value measurement. The glossy feeling calculated by the above formula approximately equates to the glossiness evaluated by a person based on their visual observation. Evaluation standards were as follows:

A: Monochrome glossy feeling of 4.0 or more.

B: Monochrome glossy feeling of less than 4.0.

Blackness Evaluation

Colorimetry was performed for each of the obtained recorded articles at angles of 2 degrees and 20 degrees, using a declination colorimetry system (spectrophotometric colorimetry system that can conduct 2-degree angle colorimetry and 20-degree angle colorimetry at the same time, which is manufactured by JASCO Corporation (ARM-500V, V550, and VWCT-615)), with a D-65 light source, and with the baseline established as X, Y, Z=0, 0, 0. Based on the resulting a* values in the 2-degree angle and 20-degree angle colorimetric values, the Δa* value was calculated for each duty level output, and then the average Δa* value in all duty level outputs was calculated (average angular dependence). This average angular dependence value shows the hue difference between a bronze color and a 20-degree angle colorimetry, i.e., to what extent the color perception is dependent on the angle of the light. The smaller the value is, the less change in blackness or hue is caused according to the change in the angle of the light, i.e., the less the angular dependence is. Furthermore, the difference between the maximum and minimum values of the Δa* values in all duty level outputs (i.e., black feeling) was calculated. This difference value is a value evaluating the hue difference between a bronze color and a 20-degree angle colorimetry over all duty level outputs. The smaller the value is, the less change in blackness or hue is caused according to the change in the duty level or in the angle of the light source.

The glossy feeling, average angular dependence and black feeling in Example 1 and Comparative Examples 1 to 3 were as follows:

|  | Glossy feeling | Average angular dependence | Black feeing |
|---|---|---|---|
| Example 1: | A | 0.6 | 1.0 |
| Comparative Example 1: | A | 1.3 | 0.9 |
| Comparative Example 2: | A | 0.4 | 1.2 |
| Comparative Example 3: | A | 0.6 | 1.9 |

In Comparative Example 1, since the a* value in the 2-degree angle colorimetry increased with the change in the angle of the light, the output was perceived in some cases with a shining red color, i.e., as a brown-tinged black. In Comparative Examples 2 and 3, the a* value in the 2-degree angle colorimetry largely varied according to the duty level, which means it is difficult to generate stable monochrome images. (See the graph shown in FIG. 1.)

The invention is industrially applicable as a black ink composition for enabling a neutral black output with improved glossiness, average angular dependence and blackness in both 20-degree and 2-degree angle colorimetric values.

What is claimed is:

1. A black ink composition comprising a phthalocyanine-based pigment, a benzimidazolone-based pigment and a carbon black pigment, wherein the phthalocyanine-based pigment is C. I. Pigment Blue 15:4, C. I. Pigment Blue 15:3 or C. I. Pigment Blue 15:2.

2. The black ink composition according to claim 1, wherein the phthalocyanine-based pigment, the benzimidazolone-based pigment and the carbon black pigment are present, in the ink composition in respective amounts such that, when the black ink composition is applied to a medium having a layer of resin coating, and the black ink composition exhibits a 20-degree angle colorimetry L* value of 0.5 or less, it exhibits a 20-degree angle colorimetry a* value larger than a 2-degree angle colorimetry a* value by a value ranging from 0 to 1.3 inclusive.

3. The black ink composition according to claim 1, wherein the benzimidazolone-based pigment is selected from the group consisting of C. I. Pigment Yellow 151, C. I. Pigment Yellow 180, C. I. Pigment Yellow 181, C. I. Pigment Orange 64, C. I. Pigment Violet 32 and C. I. Pigment Red 185.

4. The black ink composition according to claim 1, wherein the weight ratio of the total amount of the phthalocyanine-based pigment and the benzimidazolone-based pigment to the carbon black pigment is 1:2, or less.

5. The black ink composition according to claim 1, wherein the weight ratio between the phthalocyanine-based pigment, the benzimidazolone-based pigment and the carbon black pigment is (0.01 to 0.15):(0.01 to 0.15):1.5.

6. The black ink composition according to claim 1, wherein the weight ratio of the phthalocyanine-based pigment to the benzimidazolone-based pigment is within the range of 1:2 to 1:10.

7. An ink cartridge containing at least the black ink composition according to claim 1.

8. A recording method for conducting recording comprising (a) providing at least the black ink composition according to claim 1; and (d) depositing the black ink composition onto a recording medium to form a recorded article.

9. A recorded article recorded by the recording method according to claim 8.

10. The black ink composition according to claim 3, wherein the phthalocyanine-based pigment, the benzimidazolone-based pigment and the carbon black pigment are present, in the ink composition in respective amounts such that, the black ink composition is applied to a medium having a layer of resin coating, and the black ink composition exhibits a 20-degree angle colorimetry L* value of 0.5 or less, it exhibits a 20-degree angle colorimetry a* value larger than a 2-degree angle colorimetry a* value by a value ranging from 0 to 1.3 inclusive.

11. The recording method according to claim 8, wherein the recording medium comprises a layer of resin coating, wherein the phtalocyanine-based pigment, the benzimidazolone-based pigment and the carbon based pigment are present in the black ink composition in respective amounts such that, with the black ink composition applied to the recording medium comprising the layer of resin coating, when the black ink composition exhibits a 20-degree angle colorimetry L* value of 0.5 or less, it exhibits a 20-degree angle colorimetry a* value larger than a 2-degree angle colorimetry a* value by a value ranging from 0 to 1.3 inclusive.

12. A recorded article recorded by the recording method according to claim 11.

13. A recording method for conducting recording comprising (a) providing at least the black ink composition according to claim 3; and (b) depositing the black ink composition onto a recording medium to form a recorded article, wherein the recording medium comprises a layer of resin coating, wherein the phtalocyanine-based pigment, the benzimidazolone-based pigment and the carbon based pigment are present in the black ink composition in respective amounts such that, with the black ink composition applied to the recording medium comprising the layer of resin coating, when the black ink composition exhibits a 20-degree angle colorimetry L* value of 0.5 or less, it exhibits a 20-degree angle colorimetry a* value larger than a 2-degree angle colorimetry a* value by a value ranging from 0 to 1.3 inclusive.

14. A recorded article recorded by the recording method according to claim 11.

* * * * *